United States Patent [19]

Myers

[11] Patent Number: 4,715,581
[45] Date of Patent: Dec. 29, 1987

[54] DAMPER CONSTRUCTION

[75] Inventor: Jerome J. Myers, Maple Grove, Minn.

[73] Assignee: Sheet Metal Connectors, Inc., Minneapolis, Minn.

[21] Appl. No.: 28,879

[22] Filed: Mar. 23, 1987

[51] Int. Cl.$^4$ .............................................. F16K 1/22
[52] U.S. Cl. ................................. 251/308; 251/305; 137/315
[58] Field of Search ............... 251/304, 305, 306, 308; 137/315

[56] References Cited

U.S. PATENT DOCUMENTS

| | | |
|---|---|---|
| 249,303 | 11/1881 | Clark . |
| 403,489 | 5/1889 | Schofield . |
| 794,534 | 7/1905 | Myers . |
| 901,485 | 10/1908 | Schafer . |
| 980,011 | 12/1910 | Schafer . |
| 1,398,038 | 11/1921 | Olinger . |
| 1,458,144 | 6/1923 | Olinger . |
| 1,480,949 | 1/1924 | Olinger . |
| 1,841,645 | 1/1932 | Anderson ............................ 251/308 |
| 1,972,677 | 9/1934 | Bornheim ............................ 126/292 |
| 2,124,484 | 7/1938 | Corbman et al. .................... 120/292 |
| 2,134,844 | 11/1938 | Schartow ............................ 126/292 |
| 2,186,789 | 1/1940 | Rosenberg ...................... 251/308 X |
| 2,285,829 | 6/1942 | Maage, Jr. ...................... 251/305 X |
| 2,309,425 | 1/1943 | Weyenberg ............................ 236/45 |
| 2,433,749 | 12/1947 | Field, Jr. ............................ 236/45 |
| 3,007,673 | 11/1961 | Paxton et al. ...................... 251/297 |
| 4,610,197 | 9/1986 | Van Becelaeri ................ 251/305 X |

Primary Examiner—A. Michael Chambers
Assistant Examiner—John C. Fox
Attorney, Agent, or Firm—Kinney & Lange

[57] ABSTRACT

A damper to be pivotally mounted and eventually clamped in a cylindrical air duct includes a circular damper blade, a first pivot pin extending integrally radially outwardly from the blade, a damper clip mounted on the opposite side of the blade to have a slidably mounted second pivot pin extending radially outwardly from the blade on the same diameter as the first pin. The blade is provided with a pair of parallel, spaced-apart and upstanding positioning beads situated to positively position the damper clip and the axis of the second pivot pin. A pair of parallel, spaced-apart elongate, upstanding stiffening beads are spaced from and parallel to the diametrical axes of the positioning pins.

13 Claims, 5 Drawing Figures

DAMPER CONSTRUCTION

BACKGROUND OF THE INVENTION

1. Field of the Invention

This invention has relation to air volume control dampers installed in cylindrical ducts.

2. Description of the Prior Art

Customarily an air volume control damper is used for reducing flow volume in a duct, not positive shutoff. For many years such air volume control dampers have been pivotally mounted in ducts and each has then been fixedly positioned to adjust by reducing the volume of air flow in its duct to balance that flow with respect to the flow through other ducts in a particular forced air or warm air heating system.

In heating, ventilating and air conditioning systems using a network of ducts to distribute air from a central source to various separated locations, the optimum location of the air volume control dampers along such ducts cannot be easily determined in advance of actual installation. For that reason, the dampers must be so structured that they can be installed in the ducts in the field after the ducts have been formed. This ability to be field installed to pivot on axes normal to the longitudinal axes of ducts having cylindrical sheet metal walls is a prerequisite of substantially all of the prior art structures discussed below.

It is known to mount a flat circular damper plate or blade in a cylindrical duct by attaching damper clips on diametrically opposite sides of the damper blade and by extending threaded pivot pins outwardly from those clips through the side walls of the duct. Such a damper was adjusted to a proper angle in the duct so as to get the desired amount of air flow through it. It was then fixedly positioned with respect to the duct by turning butterfly nuts down on the threaded pivot pins to clamp the inner face of the duct up against the damper clips. See U.S. Pat. No. 2,134,844 granted to Schartow in November of 1938; and U.S. Pat. No. 1,458,144 granted to Olinger in June of 1923.

It is known to deform draft control damper shutters to provide reinforcing and stiffening ribs. See U.S. Pat. No. 2,309,425 granted to Weyenberg in January of 1943; U.S. Pat. No. 2,124,484 granted to Corbman et al. in July of 1938; and U.S. Pat. No. 1,972,677 granted to Bornheim in September of 1934.

It is known to form pivot members which are integral with cast iron or steel damper blades. See U.S. Pat. No. 901,485 granted to Schafer in October of 1908; and U.S. Pat. No. 980,011 granted to Schafer in December of 1910.

Other patents which were cited as pertinent in a search of the prior art, and which appear to be of general interest in relation to the present invention are:

| U.S. Pat. No. | Patentee | Granted |
| --- | --- | --- |
| 249,303 | Clark | November 1881 |
| 403,489 | Schofield | May 1889 |
| 794,534 | Meyers | July 1905 |
| 1,398,038 | Olinger | November 1921 |
| 1,480,949 | Olinger | January 1924 |
| 2,433,749 | Field, Jr. | December 1947 |
| 3,007,673 | Paxton et al. | November 1961 |

Before the present invention, in order to obtain precision, it has been customary to cut out damper blades using a circular shear. This was a labor intensive and time consuming practice where production of relatively large numbers of dampers were required.

What was needed before the present invention was a circular damper which was inexpensively made, but precision made to be easily fitted into a cylindrical duct and to be pivoted on diametrically opposite sides thereof in the duct. Such a damper should not vibrate in the duct regardless of its positioning and regardless of the velocity of the air flow through the duct. It should be producable in substantial quantities at extremely low prices. The damper of the present invention fulfills these objectives.

SUMMARY OF THE INVENTION

A damper to be pivotally mounted in a pair of diametrically opposed aligned pivot openings provided in opposite sides of an air duct includes a generally flat damper blade having an outer periphery generally congruent with the inner periphery of the air duct on a plane normal to the longitudinal axis of the duct and passing through the pivot openings in the duct. In addition to the damper blade, the damper includes a first pivot pin integral with the damper blade and extending outwardly from it in direction so that it can pass through one of the pivot openings as the damper is being installed in the duct. A damper clip which is adapted to be mounted on the damper blade includes a second pivot pin, the damper clip having mutually parallel, spaced-apart, upstanding edges lying in parallel relation to the axis of the second pivot pin. The damper blade is provided with a pair of parallel, spaced-apart positioning beads lying in parallel relation to, and on either side of, the axis of the first pivot pin, these positioning beads extending upwardly from a top side of the damper blade in position to register with and to positively align the mutually parallel, upstanding, side edges of the damper clip to thereby position the axis of the second pivot pin in coincident relation to the axis of the first pivot pin. Means are provided for permanently attaching the damper clip to the damper blade when the parts are so aligned.

In the form of the invention as shown, the damper blade is circular and the axes of the pivot pins lie on a damper blade pivot axis constituted as a diameter of the blade. Also as shown, the damper blade is provided with a pair of elongate, mutually parallel, upstanding, spaced-apart stiffening beads which are shown to be parallel to and on either side of the damper blade positioning axis, each stiffening bead being about the same distance from the pivot blade axis as the other.

Although the damper blade disclosed herein is circular, the invention is equally applicable to blades of other shapes such as rectangular, oval, etc.

DETAILED DESCRIPTION OF THE PREFERRED EMBODIMENTS

Figure 3:
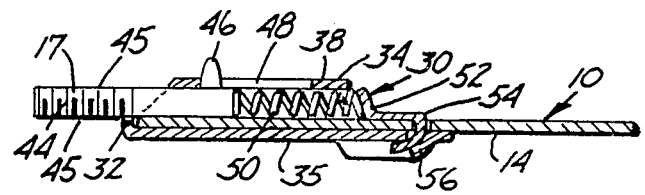
FIG. 3 is an enlarged fragmentary vertical sectional view taken on the line 3—3 in FIG. 1 but omitting the air duct.
Figure 2:
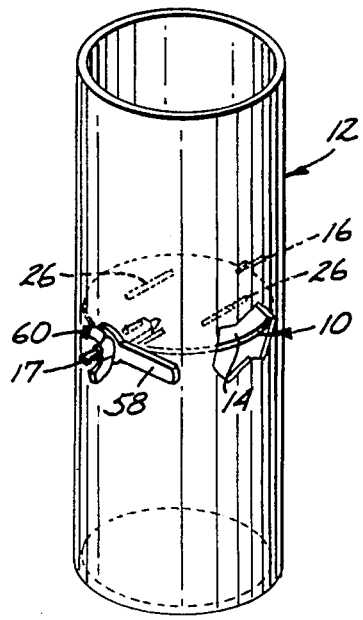
FIG. 2 is a perspective view of such a cylindrical duct with the damper of FIG. 1 being shown in phantom and with a threaded pivot pin of that damper being shown in full lines.

A damper 10 is pivotally mounted in an air duct 12. The damper includes a circular damper plate or blade 14 which can be made, for example, of galvanized steel. The damper also includes a first pivot pin 16 and a second threaded pivot pin or rod 17. The pivot pin 16 is integral with the damper blade 14 and is stamped out of the same piece of galvanized steel or other suitable material as is the damper blade. The longitudinal axes of each of the pivot pins lies on a pivot axis 20 constituted as a line lying on a diameter of the circular blade 14.

After the damper is installed in the air duct 12, pivot pins 16 and 17 will extend through damper bearings or openings 22 and 23, respectively, provided in the wall of the duct 12.

The damper blade 14 is provided with positioning bead means here shown as a pair of mutually parallel, spaced-apart, elongate, upstanding, positioning beads 24,24 lying in parallel relation to the pivot axis 20.

Damper blade 14 is also provided with a pair of mutually parallel, spaced-apart, elongate, upstanding, stiffening beads 26,26 also parallel with the pivot axis 20. As shown, each of these stiffening beads 26 extends substantially equal distances on either side of an imaginary diameter 27 of damper blade 14 which lies at right angles to pivot axis 20; and each is approximately halfway from the center of the blade 14 to the outer edge measured along diameter 27.

To stiffen the first pivot pin 16 and to shape it so that it will pivot more easily in its damper bearing or opening 22, an elongate, upstanding pivot pin bead 28 is provided in the damper blade 14 and in the first pivot pin 16.

Each of these five beads 24,24 26,26 and 28 is formed in the circular damper blade 14 and, in the case of the pivot pin bead 28, in the first pivot pin 16, by a punch press operation at the same time that the blade 14 and first pivot pin 16 are sheared from an appropriate sheet of material. This shearing and forming process is well known in the art, and details of it form no part of the present invention per se. Use of an appropriate punch and die, however, insures that each damper so formed will have precisely the correct shape and dimension.

In order to precisely position the second threaded pivot pin 17, a damper clip 30 is provided. This damper clip 30 is in some ways similar to the damper clip construction shown in FIGS. 3 through 8 of the aforementioned patent to Schartow in that clip 30 consists of a piece of sheet metal bent double about its mid-point or base portion 32 so as to produce two side members 34 and 35 parallel to each other, but spaced apart sufficiently to permit the insertion of the damper blade 14 therebetween. For clarity of description, the side member 34 will be referred to as the top side member and the side member 35 will be referred to as the bottom side member. Here the similarity to the damper clips of Schartow ends.

Figure 4:
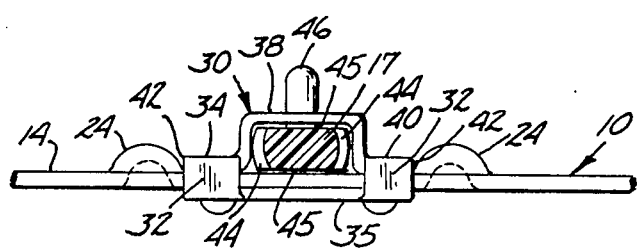
FIG. 4 is a further enlarged sectional and side elevational view of the damper taken on the line 4—4 in FIG. 1, but omitting the air duct.
Figure 5:
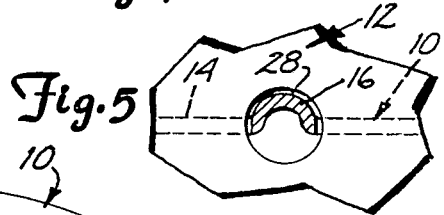
FIG. 5 is an enlarged vertical fragmentary side elevational and cross sectional view taken on the line 5—5 in FIG. 2.
Figure 1:
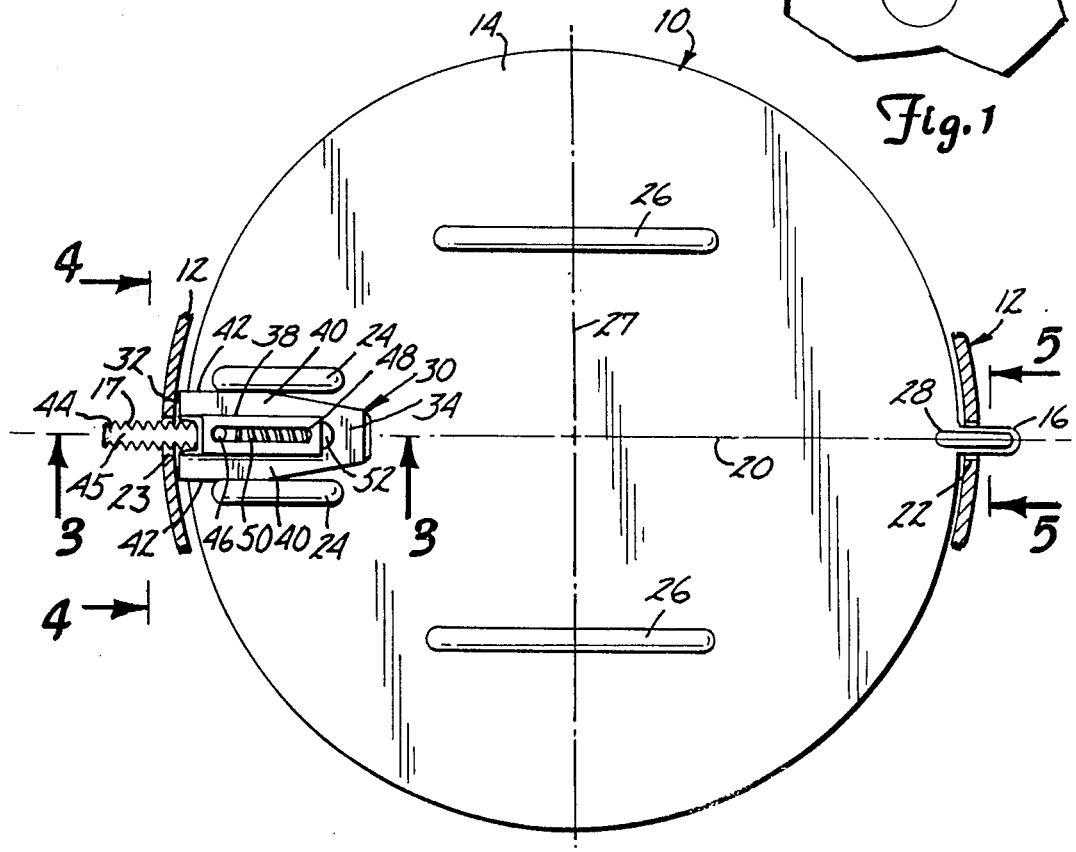
FIG. 1 is a top plan view of a damper of the present invention and a fragmentary horizontal sectional view of portions of a vertical cylindrical duct in which the damper is mounted.

As best seen in FIGS. 1 and 4, top side member 34 is provided with a tunnel 38 to slidably receive second threaded pivot pin 17, this tunnel extending integrally outwardly into a pair of flanges 40,40 which are partially defined by mutually parallel outer edge surfaces 42,42. These edge surfaces define second pivot pin alignment means.

As seen in FIGS. 1, 3 and 4, the second threaded pivot pin or rod 17 includes generally cylindrical threaded side surfaces 44,44 and mutually parallel spaced-apart top and bottom flat surfaces 45,45. Also an integral part of second pivot pin 17 is an upstanding guide finger 46 extending integrally from the top surface 45 at the inner end of the pin 17 to run in a guide slot 48 provided in the top of the tunnel 38 along the pivot axis 20 of the damper blade 14. A compression coil spring 50 in the tunnel 38 is confined by a rear wall 52 of the tunnel to press against the inner end of the pivot pin 17 to normally hold it in position as seen in FIG. 1.

The top side member 34, before being installed on the damper blade 14, is provided with a substantially vertically extending tang 54 at its innermost end; and the bottom side member 35 is provided with an outwardly facing deflection lip 56 immediately below the tang, the outward edge of this lip being separated from the generally flat surface of the bottom side member to provide a tang receiving opening.

To install the clip 30 on the damper blade 14 to position the second threaded pivot pin 17 so that its longitudinal axis is precisely in alignment with the longitudinal axis of the first pivot pin 16 along the diameter of the pivot axis 20, the portion of the damper blade 14 between the positioning beads 24,24 is slid between the top side member 34 and the bottom side member 35 of the clip to bring the outer edges 42,42 in positive contact with the positioning beads. The spacing of these positioning beads 24,24 and of the outer edges 42,42 of the top side member 34 is such that the longitudinal axis of pivot pin 17 must necessarily lie precisely on the pivot axis 20 in the position as seen in FIG. 1. With the blade 14 tight up against the base portion 32 of the clip 30, the tang 54 will be hit with a hammer or the like from above forcing it through blade 14 and down against the deflection lip 56 causing the tang to take the position as seen in FIG. 3 positively locking clip 30 in pposition on blade 14.

Clips such as the clip 30 are not new and have been assembled onto damper blades in the past by using various external jigs and fixtures to attempt to positively position them so that pivot pins such as the second pivot pin 17 can lie precisely on diametrical pivot axes. However, in the prior art any shifting whatever of the parts during the operation of forcing the tang down through the damper blade results in a less than perfect alignment of the pivot pins, and this has, in the past, caused an unacceptable number of rejects. Because of the deformation of metal which is involved in both the damper blade and in the clip during such a process, such rejects result in the complete discarding of the rejected pieces.

What the present invention has accomplished, among other things, is the production of a damper blade which provides an infallible means for assuring that a permanent integral pivot pin on one end of a diametrical pivot axis of a circular damper will be accompanied by the positioning of a second slidable pivot pin on the other end of that axis by providing precisely positioned positioning beads in the damper blade itself at the time the damper blade and first pivot pin are formed.

In use in the field, as soon as the desired position of a damper in a duct is determined and suitable openings 22 and 23 are provided in diametrically opposite positions in a plane at right angles to the longitudinal axis of the air duct, the upstanding guide finger 46 of guide pin 17 will be manually slid to the inner end of guide slot 48, thus moving the outer end of the pivot pin 17 to position inside of the base portion 32 of the clip 30. The damper will be inserted into the duct, the first pivot pin 16 inserted into the opening 22, and the second pivot pin 17 aligned with the opening 23 in the duct. The guide finger 46 will be released, and the pivot pin 17 will extend through opening 23 to position as seen in FIG. 1 under the urging of the spring 50.

Then, in accordance with the teachings of the prior art, a control arm or handle 58 having a slotted opening to receive the outer portion of the pivot pin 17 and to closely encompass the flat mutually parallel surfaces 45,45 of the pivot pin, will be installed over the pin 17 to lie substantially in the plane of the damper blade 14. This handle 58 will be used to experimentally control the positioning of the damper blade 14 of damper 10 inside of the duct 12. As the proper positioning is established to achieve the desired air flow, a butterfly nut 60 is threaded onto the outer end of the second pivot pin 17, and is tightened down to clamp the damper clip 30 firmly against the inner surface of the air duct 12 to permanently position the damper 10 for its intended use and its intended purpose.

Although the present invention has been described with reference to preferred embodiments, workers skilled in the art will recognize that changes may be made in form and detail without departing from the spirit and scope of the invention.

What is claimed is:

1. A damper for pivotally mounting in a pair of diametrically opposite aligned pivot openings provided in opposite sides of an air duct, said damper including:
   A. a generally flat damper blade having an outer periphery generally congruent with the inner periphery of the air duct on a plane normal to the longitudinal axis of the duct and passing through said pivot openings;
   B. a first pivot pin integral with and extending outwardly from the blade in direction so that it passes through one of the pivot openings as the damper is being installed in the duct;
   C. the damper blade being provided with integrally formed positioning bead means lying in aligned relation to the axis of the first pivot pin at a side portion of the damper blade opposite the first pivot pin, said bead means extending out of the plane of the damper blade;
   D. a damper clip adapted to be mounted on the damper blade and including a second pivot pin, said damper clip being provided with second pivot pin alignment means cooperative with the bead means for aligning the second pivot pin with the first pivot pin to provide a pivot axis for the damper blade; and
   E. means for permanently attaching the damper clip to the damper blade when positioned by the damper blade positioning bead means.

2. The damper of claim 1 wherein:
   F. the first pivot pin and the damper blade are stamped out of a single sheet of material in a single operation and said damper blade positioning means is formed during that same operation.

3. A damper for pivotally mounting in a pair of diametrically opposite aligned air duct pivot openings provided in opposite sides of an air duct, said damper including:
   A. a generally flat damper blade having an outer periphery generally congruent with the inner periphery of the air duct on a plane normal to the longitudinal axis of the duct and passing through said air duct openings;
   B. a first pivot pin integral with and extending outwardly from the blade in direction so that it passes through one of the duct openings as the damper is being installed in the duct;
   C. a damper clip adapted to be mounted on the damper blade and including a second pivot pin, said damper clip having mutually parallel, spaced apart, upstanding edges lying in parallel relation to the axis of the second pivot pin;
   D. the damper blade being provided with a pair of parallel, spaced-apart positioning beads lying in parallel relation to, and on either side of, the axis of the first pivot pin, said beads extending upwardly from a top side of the damper blade in position to register with and positively align the mutually parallel, upstanding, side edges of the damper clip to position the axis of the second pivot pin in substantially coincident relation to the axis of the first pivot pin; and
   E. means for permanently attaching the damper clip to the damper blade when so positioned by said damper blade beads.

4. The damper of claim 3 wherein:
   F. the damper blade and the first pivot pin are stamped from a single sheet of material in a single operation and said positioning beads are formed during that same operation.

5. The damper of claim 3 wherein:
   F. the damper blade is circular in outer periphery and the axes of the pivot pins lie on a damper blade pivot axis constituted as a diameter of the blade.

6. The damper of claim 5 wherein:
   G. the damper blade and first pivot pin are provided with a single, elongate, upstanding pivot pin bead extending from an outer end portion of the first pivot pin into the circular body of the damper blade.

7. The damper of claim 6 wherein:
   H. the first pivot pin and the damper blade are stamped out of a single sheet of material.

8. The damper of claim 5 wherein:
   G. the damper blade is provided with a pair of elongate, mutually parallel, upstanding, spaced-apart stiffening beads.

9. The damper of claim 8 wherein:
   H. the stiffening beads are parallel to and on either side of the damper blade pivot axis, each being about the same distance from the blade pivot axis as the other.

10. The damper of claim 9 wherein:
    I. the axes of the stiffening beads lie substantially farther from the pivot pin axis than do the axes of the mutually parallel positioning beads.

11. The damper of claim 9 wherein:
    I. the damper blade and first pivot pin are provided with a single, elongate, upstanding pivot pin bead extending from an outer end portion of the first pivot pin into the circular body of the damper blade.

12. The damper of claim 11 wherein:
    J. the first pivot pin and the damper blade are stamped out of a single sheet of material.

13. The damper of claim 12 wherein:
    K. the positioning and stiffening beads and the first pivot pin bead are constituted as dish-like depressions formed into the sheet of material making up the damper blade and the first pivot pin.

* * * * *